Dec. 2, 1969          C. J. KOESTER          3,481,674
APPARATUS FOR DETERMINING THE DEGREE OF INVERSION
Filed Oct. 23, 1965

Nd. ENERGY LEVELS

INVENTOR.
CHARLES J. KOESTER
BY
Stanley J. Yarner
ATTORNEY

United States Patent Office 3,481,674
Patented Dec. 2, 1969

3,481,674
APPARATUS FOR DETERMINING THE DEGREE OF INVERSION
Charles J. Koester, South Woodstock, Conn., assignor, by mesne assignments, to American Optical Corporation, a corporation of Delaware
Filed Oct. 23, 1965, Ser. No. 503,076
Int. Cl. G01n 21/06, 21/22
U.S. Cl. 356—201                              4 Claims

ABSTRACT OF THE DISCLOSURE

An apparatus for determining the degree of inversion attained in a specific laser device after pumping is provided. The apparatus includes a light source coupled to the active laser material. The wavelength of light emitted from the light source corresponds to the wavelength of excited state absorption of active ions within the laser material. A dectector is optically aligned with the light source and laser material so that the depletion of light from said light source can be measured to determine the amount of active ions in an excited state.

---

Figure 1:
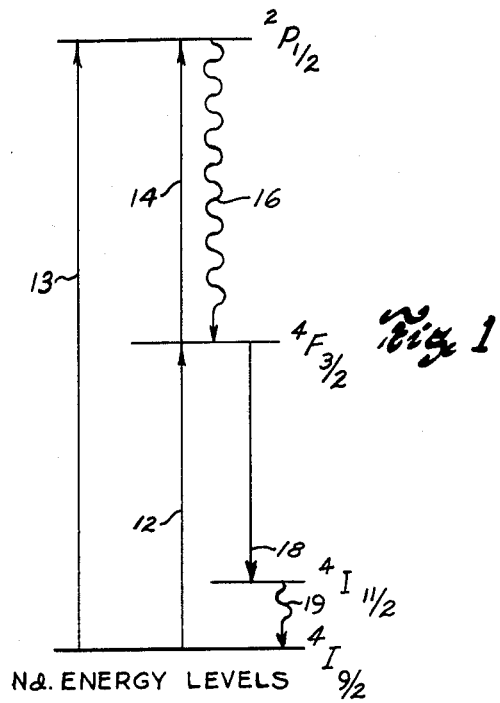

This invention relates to laser apparatus and more particularly to the detection of ion inversion in lasers.

Lasers, otherwise referred to as optical masers, are light-amplifying or light-oscillation producing devices and are specifically adapted to provide an output of high-intensity, coherent, monochromatic light. Such light is produced in a laser (an acronym for light amplification by stimulated emission of radiation) by photonic emission from the active ions or atoms of a body composed of a so-called laser material. These atoms, which are in a "positive temperature" state absorb a quantum of light from a flash lamp, which is at a frequency related to the difference in energy between two of the energy levels of the laser ion. The ions are, therefore, "pumped" or excited to a high energy level and subsequently to a "negative temperature" state of population inversion. From the high energy level, they rapidly relax to a more stable intermediate level (still above the original level) at which level the inversion is established. The ions then relax, at a somewhat slower rate, from this intermediate or metastable level to the original level with an attendant emission of light. This emission by the spontaneous relaxation to the original level is fluoroscence, which stimulates a further relaxation of atoms or ions still at the intermediate level and the desired laser output is thereby stimulated. The laser output is coherent since it moves in the same direction in space and time to the stimulating fluorescent light given off by the spontaneous emission, and intensity in a narrow cone is provided by the structure of a laser, which is in the form of a rod, one end of which is totally reflective and the other end of which is slightly transmissive. The only light which is strongly amplified is that which moves in a direction perpendicular to the ends, and, therefore, the output has almost all of its intensity in a narrow cone.

By way of example, one conventional form of laser structure and its operation is described in copending U.S. patent application for Glass Laser, S.N. 168,012, by Elias Snitzer, inventor, filed Jan. 16, 1962, and similarly assigned to American Optical Company.

In certain experimental and applied uses for lasers, it is useful to determine, with reasonable accuracy, the degree of population inversion in the laser body or rod. One means for accomplishing this result is to measure the light intensity of the spontaneously-emitted light from the laser which occurs as the ions go through a transition from the metastable or fluorescent level to the ground level (or a terminal level). However, it is known that with long rod lasers, the traversing of the length of the rod by the spontaneously-emitted light causes an amplification and increasing intensity in that light, which results in a deceivingly high intensity for a moderate level of inversion. A further means for accomplishing the detection of inversion level is to measure the stimulated light output of a laser; however, with this method the intensity increases after the laser has attained a level of inversion above theshold, while at the same time the inversion is substantially constant. This latter phenomenon is exhibited by reference to the plot for any laser device of time after pumping versus inversion. Such a plot will show a rise in inversion immediately after pumping until threshold is attained and then a constant inversion after the lasering action begins. After threshold or in other words after lasering action begins, the intensity continues to build up while the inversion is constant.

Accordingly, it is a primary object of the present invention to disclose laser apparatus useful for detecting the level of inversion of ions in a laser body at any specific time in the laser cycle of operation;

A further object is to provide such apparatus which is capable of ascertaining the level of inversion in a simple or reliable manner.

These and other objects are accomplished in one illustrative embodiment of the invention wherein a laser body or material which exhibits an excited state absorption has its level of inversion detected by directing therethrough a light whose wavelength corresponds to the wavelength of that absorption. The intensity of the light transmitted through the laser body is measured and is determinative of the level of inversion. The intensity of the light transmitted increases as the amount of absorption between the fluorescent energy level and a higher energy level of the laser body decreases and, since absorption increases within increased inversion, the high level of intensity of transmitted light is determinative of a lower level of inversion.

Figure 2:
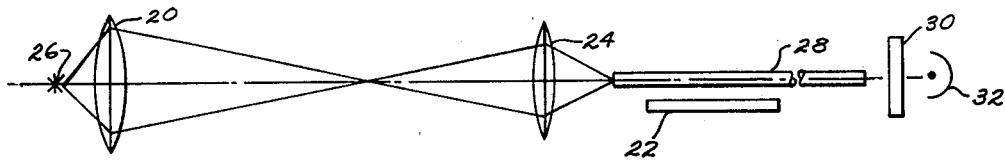

Other objects, features and embodiments of the invention will become apparent by the following more detailed description and reference to the accompanying drawings, wherein FIG. 1 is a partial energy level diagram for a typical laserable ion with the levels being depicted by standard spectroscopic notation; and FIG. 2 is a schematic representation of apparatus useful to accomplish a purpose of the present invention.

The following descripton is based upon one illustrative embodiment of the invention wherein neodymium doped glass is the laser device whose inversion is to be measured and a gallium arsenide diode laser has its output directed through the neodymium glass so that its intensity of transmission through that glass can be used as an indicator according to the present invention. However, it should be understood to a person skilled in the art that by matching the excited state absorption wavelength of any laser material with a light-emitting device to be transmitted therethrough is sufficient for performance of the invention.

Excited state absorption of neodymium doped glass is at a wavelength of approximately 840 m$\mu$ and a sharp and reasonably strong peak appears in the glass at 432 m$\mu$ with this peak corresponding to an absorption from the ground state to a high level excited state of neodymium (arrow 13). A transition from fluorescent state to a higher state corresponds to an excited state absorption of light with a wavelength of 840 m$\mu$, and the 840 m$\mu$ wavelength is that emitted by a gallium arsenide diode laser operating at 77° K.

Referring first to FIG. 1, the enrgy level diagram (in partial form) is shown for the neodymium ion. When the neodymium is pumped from the ground state $^4I_{9/2}$ to the fluorescent level $^4F_{3/2}$ as depicted by arrow 12 by a flash tube 22 whose wavelength output corresponds to the difference in those two energy levels, a number of ions will be raised to that fluorescent state from the ground level. The inversion which is discussed herein is that inversion of ions between the $^4F_{3/2}$ state and the $^4I_{11/2}$ state. If a light is directed through the neodymium glass at the wavelength corresponding to the energy level difference between the highest excited $^2P_{1/2}$ state and the fluorescent $^4F_{3/2}$ state, the inverted ions at the fluorescent state will be raised to that highest excited state. The more ions that are present in the fluorescent state, the more excited state absorption 14 there will be to the highest excited state $^2P_{1/2}$. From there the ions spontaneously relax non-radiatively as shown by wavy arrow 16 back to the fluorescent level $^4F_{3/2}$; and subsequently the laser output or fluorescence occurs from the $^4F_{3/2}$ level to the terminal level $^4I_{11/2}$ as depicted by arrow 18; and from there the ions relax (wavy arrow 19) to ground level $^4I_{9/2}$. The excited state absorption 14, as was previously mentioned, is directly related to the amount of inverted ions or the degree of inversion. Since transmission of light at a wavelength corresponding to the absorption 14 will vary in intensity inversely with the amount of such light absorbed, it may be seen that the intensity of that transmitted light is a direct indicator of the degree of inversion.

From the foregoing it is clear that by directing light from a source at 840 m$\mu$ through neodymium doped glass, a desired result is achieved. Apparatus for performing this function is shown schematically in FIG. 2. Lenses 20 and 24 project the light from diode laser source 26 onto the end of laser rod 28 and the light emitted from the laser 28 goes through filter 30 to photomultiplier means 32. The diode laser 26 emits light at 840 m$\mu$ to the end of the laser rod 28. If any ions are at energy level $^4F_{3/2}$, they will be excited to a still higher state $^2P_{1/2}$ and thereby cause an excited state absorption of the 840 m$\mu$ light. The intensity of this 840 m$\mu$ light, which is filtered through by filter 30 can be sensed by photomultiplier means 32. If previously the 840 m$\mu$ light was directed through the laser, when it was not pumped, and the intensity sensed, the difference between this previously-sensed intensity, as a reference, and the intensity at the time of the performance of the experiment, a measure of the inversion existing in the neodymium glass is directly determined.

I claim:

1. Apparatus for determining the degree of inversion after pumping attained in a specific laser device having a laserable material doped with active ions which exhibit excited state absorption, comprising means for directing light through said laser device, said light having a wavelength corresponding to an excited state absorption wavelength of said active ions in said laser device, and means for determining the intensity of said light transmitted through said laser device whereby the intensity of said light is a measure of the degree of inversion.

2. The invention according to claim 1 wherein said first recited means is a light source and lenses and said last recited means is a photomultiplier with associated electronics.

3. The invention according to claim 1 wherein said first recited means is a gallium arsenide diode laser operating at 77° K and said lasser device comprises a neodymium doped glass.

4. The invention according to claim 1 wherein said apparatus additionally comprises a filter interposed between said last recited means and said laser device for passing light of a wavelength corresponding to said excited state absorption wavelength.

References Cited

UNITED STATES PATENTS 3,333,101   7/1967   Bell _____ 331—94.5

FOREIGN PATENTS 1,375,758   9/1964   France.

RONALD L. WILBERT, Primary Examiner

V. P. McGRAW, Assistant Examiner